United States Patent [19]

Rabold et al.

[11] Patent Number: 5,020,106

[45] Date of Patent: May 28, 1991

[54] PROCESS FOR THE CRYPTOGRAPHIC PROCESSING OF DATA AND CRYPTOGRAPHIC SYSTEMS

[75] Inventors: Peter Rabold, Wangen; Hans-Jörg Klemenz, Dielsdorf; Paul J. Schöbi, Zurich, all of Switzerland

[73] Assignee: Gretag Aktiengesellschaft, Regensdorf, Switzerland

[21] Appl. No.: 476,626

[22] Filed: Feb. 8, 1990

[30] Foreign Application Priority Data

Feb. 8, 1989 [CH] Switzerland .......................... 429/89

[51] Int. Cl.$^5$ .............................................. H04L 9/00
[52] U.S. Cl. ............................................... 380/49
[58] Field of Search ........................................ 380/49

[56] References Cited

U.S. PATENT DOCUMENTS

| | | | |
|---|---|---|---|
| 3,627,928 | 12/1971 | Wolper et al. | |
| 3,868,631 | 2/1975 | Morgan et al. | 380/49 |
| 4,434,322 | 2/1984 | Ferrell | 380/50 |
| 4,447,672 | 5/1984 | Nakamura | 380/50 |
| 4,661,657 | 4/1987 | Grenebach et al. | |
| 4,760,598 | 7/1988 | Ferrell | 380/50 |
| 4,790,013 | 12/1988 | Kage | 380/49 |

FOREIGN PATENT DOCUMENTS 2446568 8/1980 France .

OTHER PUBLICATIONS

Patent Abstracts of Japan, vol. 10, No. 87, Apr. 5, 1986.
"The New World of the Information Society", Proceeding of the Seventh International Conference on Computer Communication, Oct. 30 to Nov. 2, 1984, from "Chip to Data Networks Security Unit", pp. 854–859.
European Search Report No. RS83573CH.

*Primary Examiner*—Thomas H. Tarcza
*Assistant Examiner*—David Cain
*Attorney, Agent, or Firm*—Burns, Doane, Swecker & Mathis

[57] ABSTRACT

In a process for the cryptographic processing of data in a cryptographic system, processing takes place in two parts. In the first part the data transmission routines within a data entity and a coded text entity are detected. The clear text and the cryptographic are separately processed cryptographically in the second part and then recombined in the first part with the data transmission routines.

22 Claims, 4 Drawing Sheets

PROCESS FOR THE CRYPTOGRAPHIC PROCESSING OF DATA AND CRYPTOGRAPHIC SYSTEMS

BACKGROUND OF THE INVENTION

The invention relates to a process for the cryptographic processing of data, wherein a data entity containing a clear text and data transmission routines and a coded text entity containing cryptodata and data transmission routines, are transmitted in the form of packets to a cryptographic system, which comprises at least one coding/decoding generator and which produces output signals containing the cryptodata or the clear data, respectively. The invention further concerns a cryptographic system for the coding of clear text and the decoding of cryptodata, with a clear text interface and at least one coding/decoding generator.

Processes and systems of the aforementioned type are in worldwide use in order to protect data communications between two or more users from being accessed by unauthorized persons. Although initial applications were primarily of a military nature, the emphasis has shifted more recently to civilian areas in view of data protection laws and known misuses, for example in banking and industry. There exists a justifiable interest in making information relative to business transactions or scientific results accessible to a limited, authorized group of persons only. In many of the automated cryptographic processes heretofore used for this purpose, user data in packet form, together with the data transmission routines, are processed and transmitted cryptographically. Data packets processed in this manner are readable by cryptographic systems equipped with the appropriate keys, while for other intermediate devices the content of the user data remains hidden; they are not able to resolve the structure of the individual data packets. This, however, presents a problem for advanced data transmission systems, in particular the planned and in part already operational service integrating digital network covering entire areas (ISDN—Integrated Services Digital Network), which combines the separate long distance transmission systems for different forms of communication (voice, text, image and data services) in a public transmission system. In designing this and similar integrating systems, cryptographic processes were not considered in writing standards for data transmission routines. On the other hand, intermediate transmission devices (satellites, remultiplexers, relay centers, etc.) require information relative to the structure contained in data transmission routines of the data packets transmitted.

It has therefore already been proposed to cryptographically process the user data only. In an article in "Proceedings of the Seventh International Conference On Computer Communication," Sydney, Oct. 30–Nov. 2, 1984, pp. 854–859, Elsevier Science Publishers B.V., Amsterdam NL, the authors E.G. Graham & al. write that in byte-synchronized transmission it is necessary to leave the synchronizing information in the heading data in clear text. It is also mentioned that at the end of the data packet an information sequence must be transmitted to the receiver, so that the receiver will discontinue the decoding process and return to clear text operation. The receiver must therefore be informed when a transmission begins and when it is terminated.

In the process described in Patent Abstract of Japan, Vol. 10. No. 87 (E-393)[2144], Apr. 5, 1986, and in JP-A-60 230 737, an entire packet is on the one hand cryptographically processed, and on the other, passed through in the clear. A timed multiplexer insures the correct mixture of clear data and encoded data. In particular, the 0–31 data bits are transmitted in the clear, with a cryptogram conversion being effected to make certain that the cryptodata contain no <32 bits. Only then is it possible to install synchronous reception. This process is suitable for transmission within a certain data format. If the data format is altered, for example in transmissions from Europe to the USA, the receiver falls out of step and no meaningful decoding of cryptodata is possible.

Ep-A-94 031 (US-A 4 661 657) describes a process for the transmission in blocks of encoded data, in which it is possible to substitute synchronizing data for user data. FR-A-2 446 568 specifies that in a transmission of packet data the signaling bytes at the beginning and end of the transmission must be sent in clear. In this manner, the receiver is informed that a transmission is starting or terminating.

Finally, US-A-3 627 928 describes a cryptographic system for use with telepromters. In this type of cryptographic transmission the start bit and the stop bit are longer than the data bits. They are transmitted in clear and are recognized by the receiver.

All of these processes are applicable to data formats containing clearly recognizable starting and stopping information. These include a series of so-called "flags," which are sent at the start of a transmission (for example X.25 routine) and make synchronization at the receiver possible; and start and stop bits which have a length different from that of the data bits. In these data formats there is always a dependence between user data and control data, so that in a cryptographic system it must always be considered that CRC (cyclic redundancy check) information must be recalculated following the cryptographic processing of the user data. When data formats differ from this format, for example frame formats, these processes fail. The object therefore is to provide a cryptographic process and system, whereby the aforementioned problems are solved. In particular, data packets are to be treated cryptographically, such that the information contained in arbitrary data transmission routines relative to the structure and format of the data packets remains readable by the devices required for data transmission and located between communicating cryptographic systems. Simultaneously, it should be possible to simply replace user data with control data, for example for key changes. In particular, however, a process and a system comprising a simple cryptographic part independent of the data format used and applicable to any data format is provided.

SUMMARY OF THE INVENTION

This object is attained according to the invention by means of a process which includes the steps of detecting, in a first part of the cryptographic system, the data transmission routines within the data entity or the coded text entity, respectively; processing, in a second part of the cryptographic system, only the clear text or the cryptodata by at least one coding/decoding generator; and, combining the clear text present after processing as the cryptodata or the cryptodata present as the clear text, with the unchanged data transmission routines, such that the coded text entity is produced as the output signal of the cryptographic system in the coding operation and the data entity is produced as the output signal in the decoding operation. This object is further attained by a cryptographic system which includes a two stage construction, wherein a first part of the cryptographic system includes a frame recognition circuit and a 2:1 multiplexer unit, and a second part of the cryptographic system includes in addition to at least one coding/decoding generator, a routine generator and a routine receiver which transmit routine data. Preferred variants are the object of the dependent claims.

BRIEF DESCRIPTION OF THE DRAWINGS

Other objects and advantages will become apparent from the following detailed description of a preferred embodiment of the invention as described in conjunction with the accompanying drawings wherein like reference numerals are applied to like elements and wherein.

DETAILED DESCRIPTION OF PREFERRED EMBODIMENTS

Figure 1:
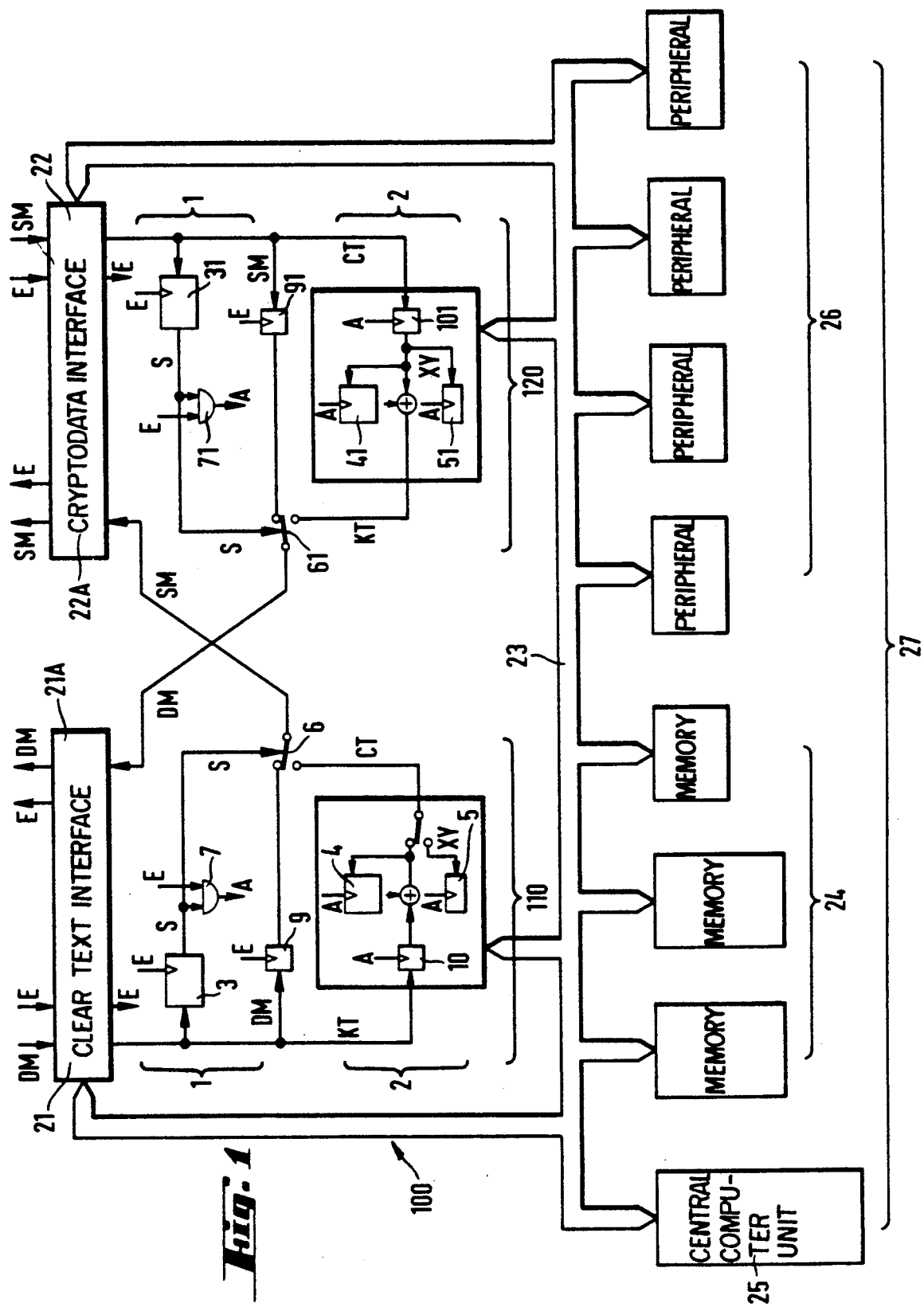
FIG. 1 shows a block diagram of an example of the configuration of the cryptographic system according to the invention.
Figure 2:
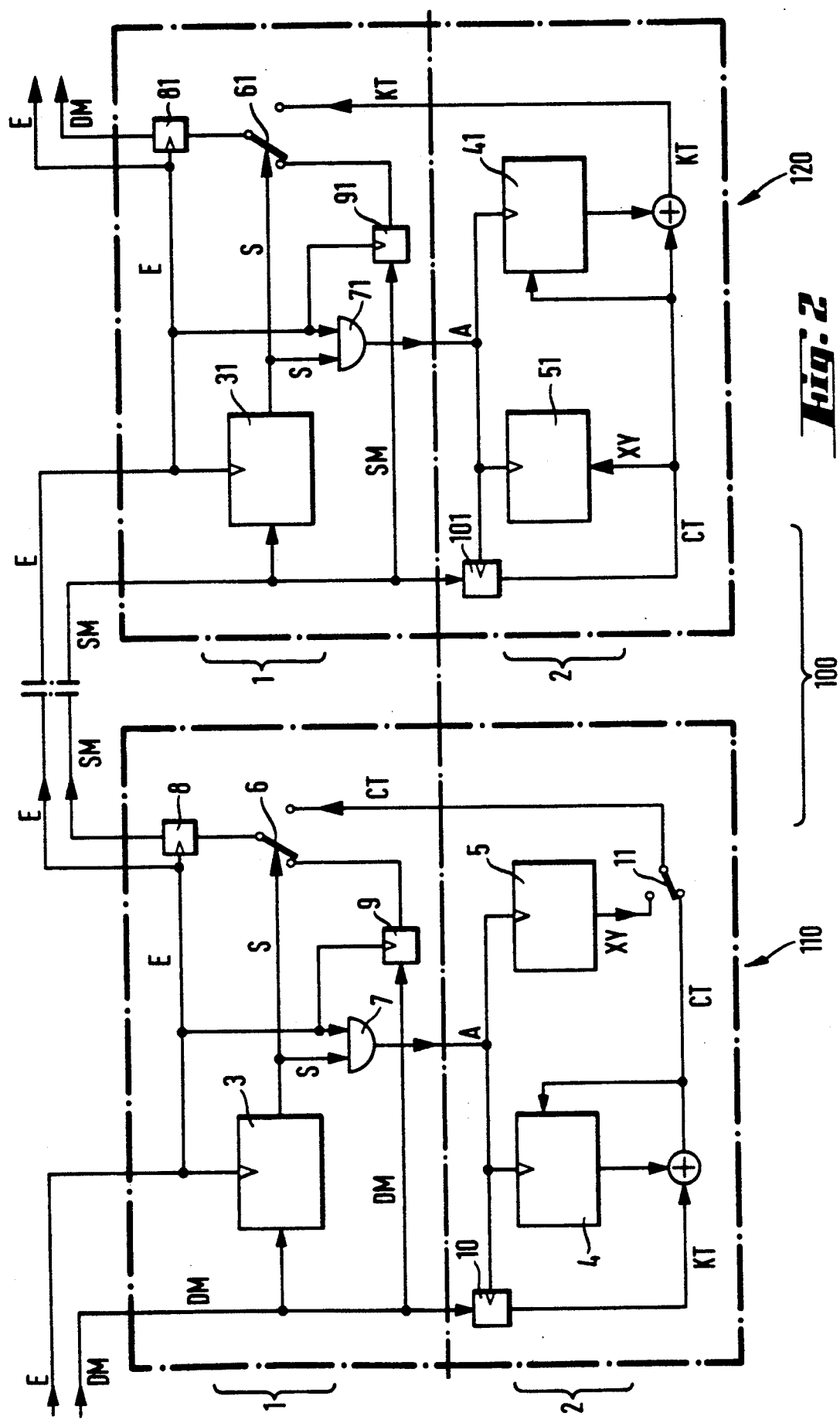
FIG. 2 shows a block circuit diagram of the essential functional elements of an exemplary embodiment of the cryptographic system according to the invention.

An exemplary preferred embodiment of the cryptographic system 100 comprises, according to FIGS. 1 and 2, a separate coding and decoding unit 110 and 120. However, the choice of this configuration should be considered exemplary only, as the cryptographic system 100 could also consist of a single part using suitable individual structural parts. FIG. 2 shows only the components of the cryptographic system 100 and their interconnection by blocks, that are essential for the invention. Prior to explaining the process according to the invention and the cryptographic system 100, it is appropriate to consider the structure of the data packets.

Figure 3:
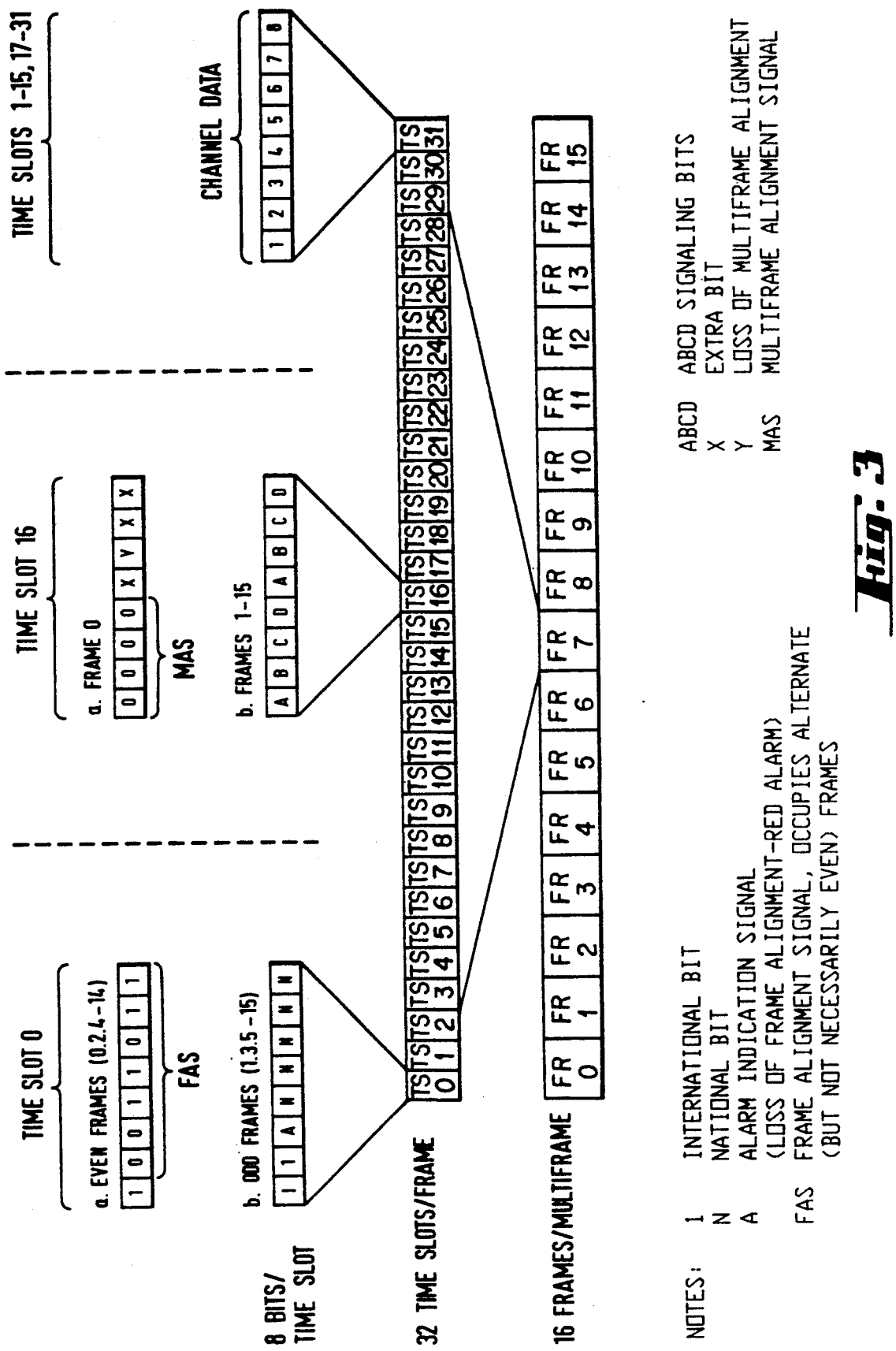
FIG. 3 shows the structure of an exemplary standardized data packet using the example of the PCM-30 format.

FIG. 3 shows the configuration of a standardized data packet for public transmission systems by the example of the PCM-30 format. This format represents a European standard in keeping with the recommendations of the CCITT (Comite Consultatif International Telegraphic et Telephonic—International Telegraph and Telephone Advisory Committee). According to this CCITT recommendation (specifically G.704), data are transmitted within a predetermined frame, divided into 32 time slots (channels) of 8 bits each. Further, 16 of these frames are combined in a superframe. The time slots of a frame are numbered consecutively 0 to 31, with the slots 1 to 15 and 17 to 31 being available for user data, while the slots 0 and 16 contain control data. The time slot 0 in particular contains the frame synchronization word, the superframe synchronization word, the so-called CRC-4 test word for the detection of transmission errors and several other control bits. The time slot 16 contains signaling information for the individual user data channels.

The nominal transmission rate is 2048 kbits/s, with each channel having a data rate of 64 kbits/s. The effective user data transmission rate thus amounts to 1920 kbits/s.

Originally, the PCM-30 format was used to transmit pulse code modulated voice signals in telephone operations. In a PCM frame, it was possible to individually code 30 telephone channels of different parties and then transmit them together digitally. The individual transmission of each individual channel in the digital PCM network took place by means of the signaling information in the time slot 16. However, in present applications the entire user data bit rate of 1920 kbit/s is increasingly used by a single party. In most cases, purely digital (computer data) or mixed, digital and PCM coded data (video conferencing, etc.) are involved. The time slot 16 then contains the signaling information to transmit all of the used data within the frame. In the following, the information contained which is additional to the user data in a data packet is designated data transmission routines.

In FIG. 1 and in more detail in FIG. 2, in the left half of the figure, the coding unit 110 and in the right half the decoding unit 120 of the cryptographic system 100 are shown configured in two parts.

In a coding operation, a data entity DM, which contains user data in the form of clear text KT and the data transmission routine PR, is fed in a packet form with the preferably symmetrical input cycle E through the clear text interface 21 into the coding unit 110 of the cryptographic system 100. In a first part 1 of the cryptographic system 100, which is clocked in the input cycle E, the data entity DM is transmitted to a frame recognition circuit 3. The frame recognition circuit 3 is for example an integrated switching circuit T1/CEPT(PCM-30) of the Rockwell International Co. Its mode of operation is described in a prospectus of the company No. 29300N10, Order No. 310, March 1987. Another integrated switching circuit for frame recognition is the MJ 1472 of the Plessey Semiconductors Co. The frame recognition circuit 3 is capable of detecting the data transmission routines within the data entity DM. Whenever the circuit detects data transmission routines PR within the data entity DM, the frame recognition circuit 3 produces on the output side a control signal S. This control signal S is fed together with the input cycle E to the inlets of an "AND" logic element 7, which is also located in the first part 1 of the cryptographic system 100. In the "AND" logic element 7 a new working cycle A is produced from the control signal S and the input cycle E, wherein $A = E \cdot S$. (The symbol "·" stands for the AND connection). The working cycle A controls the operation of the further functional elements located in the second part 2 of the cryptographic system 100. It is different from the input cycle E and usually is asymmetric, if the input cycle E is symmetric.

The data entity DM is further transmitted in the first part 1 of the cryptographic system 100 in the cycle of the input cycle E, and fed to a first flip-flop element 10 located in the second part 2. This first flip-flop element 10 is operated in the cycle of the working cycle A produced by the "AND" logic element 7. Accordingly, the data entity DM can pass the first flop-flop element 10 only in the "ENABLE" state which occurs if clear text KT is being fed in. In this manner, the clear text KT is filtered out from the data entity DM and passed on in the cycle of the working cycle A in the second part 2 of the cryptographic system 100 to a coding generator 4. In the case of a single part configuration of the cryptographic system 100, a coding/decoding generator is provided in place of the separate coding generator 4. The bit by bit coding of the clear text takes place here.

The coding generator 4 is again operated at the working cycle A. This prevents the individual bits of the clear text KT introduced through the first flip-flop element 10 from being coded a different number of times.

Coding is carried out by the usual processes, for example by applying an Exclusive-Or logic with a key sequence (stream cipher) or with block ciphers in the ECB (Electronic Code Book), CFB (Cipher Feedback) or CBC (Cipher Block Chaining) mode. As the algorithms, among several others, for example DES (Data Encryption Standard) or public coding processes may be used. For reasons of operating security, preferably self-synchronizing processes are employed, such as self-synchronizing stream ciphers or block ciphers in the 1.Bit-CFB mode.

Following the coding of the clear text KT, the latter is present in the form of cryptodata CT, which again are passed on to the first part 1 of the cryptographic system 100. In the first part 1 the cryptodata CT and the data entity DM is sent to a 2:1 multiplexer unit 6. In this multiplexer unit 6, the clear text KT is replaced bit by bit by the cryptodata CT supplied by the second part 2 of the cryptographic system 100. A second flip-flop element 9 operated in the first part 1 in the cycle of the input cycle E insures the bit accurate application of the data DM data entity to the multiplexer nit 6. It is assured that the combination of the data transmission routines together with the cryptodata CT, with the coded text SM is carried out correctly, i.e. the data transmission routines PR occupy the same bits in the coded text entity SM as in the original data entity DM. In the continuing sequence, the coded text entity SM is passed through a third flip-flop element 8 to a cryptodata interface 22A on the outlet side. The third flip-flop element 8 is operated in the inlet cycle E and is used to position the coded text entity SM in the cryptodata interface 22 in a bit accurate manner.

Since, in the 2 part design of the cryptographic system 100, the clear text KT is present in the second part 2 separated from the data transmission routines PR, it is possible to replace the clear text KT with the routine data XY, which are used, for example, for the electronic key exchange (Public Key Exchange Process) between the coding unit 110 and the decoding unit 120 of two interconnected cryptographic systems 100. For this purpose, by actuating a switch 11, a routine generator 5 is selectively activated instead of the coding generator; it is located in the second part 2 of the cryptographic system 100 and is again operated in the working cycle A. In this manner, in place of the cryptodata CT the routine data XY are passed on to the first part 1 and combined in the 2:1 multiplexer unit 6 with the data transmission routines (PR).

The decoding operation is carried out similarly to the coding operation. By means of cryptodata interface 22 on the inlet side, a coded test entity SM, containing the cryptodata CT and the data transmission routines PR, is passed together with inlet cycle E to a first part 1 of the decoding unit 120 of the cryptographic system 100. A frame recognition circuit 31 again detects the data transmission routines PR within the coded text entity SM and generates a control signal S, which in an "AND" logic element 71 is again combined, together with inlet cycle E, into a working cycle A. This working cycle A controls the operation of the functional elements located in the second part 2 of the decoding unit 120 of the cryptographic system 100, a decoding generator 41, a first flip-flop element 101 and a routine genertor 51. In the first flip-flop element 101, the cryptodata CT are again separated from the coded text entity SM. The cryptodata CT are then decoded in the decoding generator 41 and passed in the form of clear text KT to the first part 1 of the cryptographic system 100. There, they are exchanged in a 2:1 multiplexer 61 with the cryptodata CT, while a second flip-flop element 91 assures the bit accurate combination of the data transmission routines PR with the clear text KT of the data entity DM. By means of another flip-flop element 81 the data entity DM is then sent to a clear text interface 21A on the output side.

If the coded text entity SM contains the routine data XY instead of the cryptodata CT, they are detected by a routine receiver 51 and evaluated.

Figure 4:
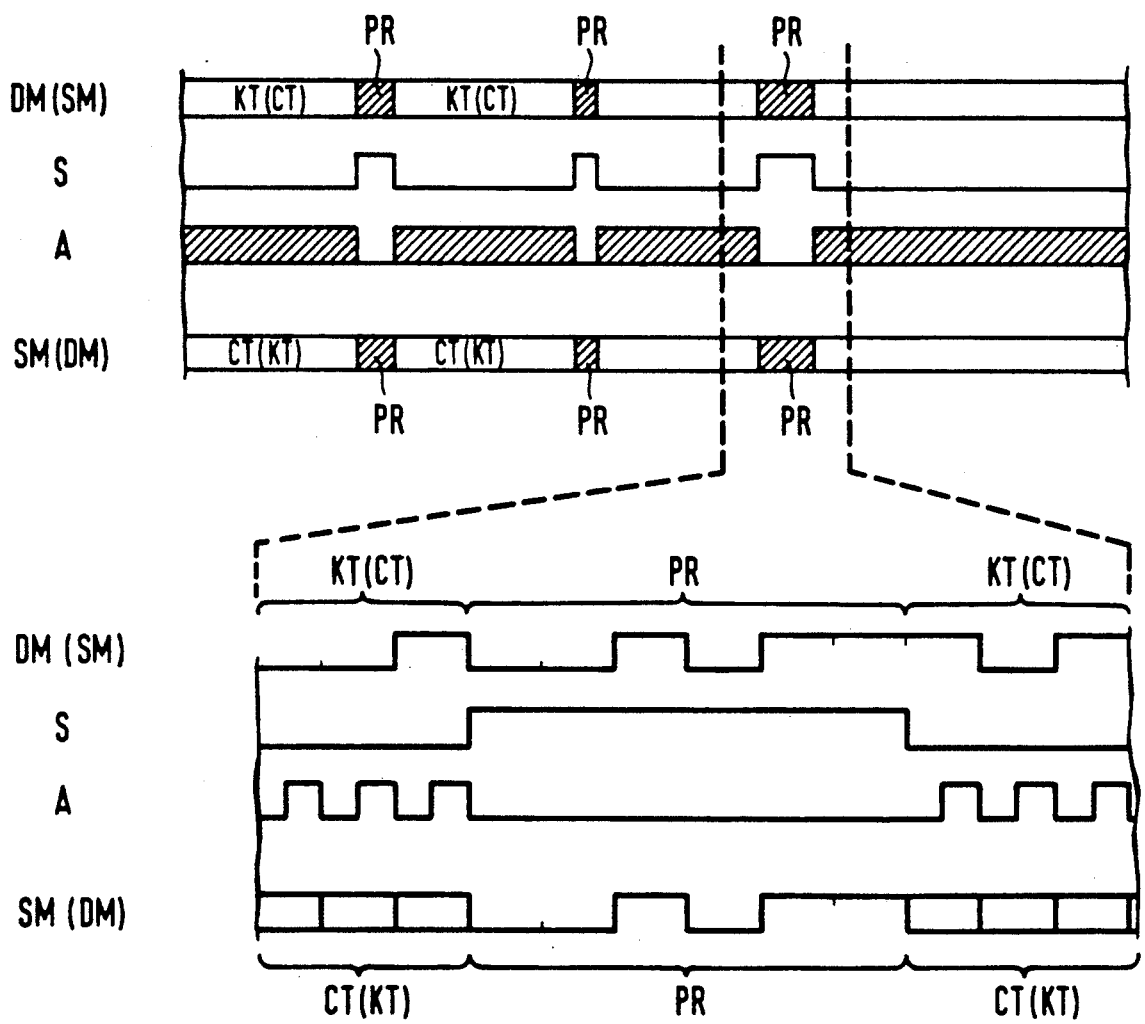
FIG. 4 shows a time sequence diagram for the coding/decoding operation according to the invention.

To further explain the invention, FIG. 4 shows a timing diagram for the coding/decoding process. The data entity DM or the coded text entity SM consists of the data trams mission routines PR and the clear text KT or cryptodata CT. In case of the transmission of the routine data XY, these take the place of the clear text KT or the cryptodata CT. Whenever the frame recognition circuit 3, 31 detects data transmission routines PR, it generates a control signal S. This control signal is combined with the inlet cycle E into a working cycle A, which in case of a symmetric inlet cycle E usually is asymmetric. Following the coding of the clear text KT and thee decoding of the cryptodata, respectively, the data processed is combined into a coded text entity SM or the data entity DM. On the outlet side the cryptodata CT inversely takes the place of the clear text KT on the inlet side. The data transmission routine PR is not altered and is located identically on both the inlet and the outlet side in a bit accurate manner.

The cryptographic system according to the invention also comprises external operating elements, which are connected through a data bus 23 with the coding and decoding units 110 and 120, as indicated in FIG. 1. The entire cryptographic system is controlled by a microcontrol system 27. This microcontrol system comprises a central computer unit 25 with a memory 24 and peripherals 26, such as user interfaces.

The process and the cryptographic system according to the invention makes a separate, automated cryptographic processing of user data in the form of clear text or cryptodata possible. The data transmission routines, which retain the information relative to the structure of the data packets, pass through the cryptographic system 100 unaltered and are located in a bit accurate manner in the data packets, both on the inlet and the outlet side. In this fashion, the data transmission devices provided between two communicating cryptographic systems are able to extract the necessary information concerning the data structure, which the cryptodata remain hidden. At the same time, the separate cryptographic processing of the clear text and the cryptodata respectively, allows the simple replacement of the user data by routine data, used for an exchange of keys.

It will be appreciated by those of ordinary skill in the art that the present invention can be embodied in other specific forms without departing form the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the cryptographic processing of data, wherein a data entity containing a clear text and data transmission routine and a coded text entity containing cryptodata and data transmission routines, are conducted in the form of packets to a cryptographic system, which comprises at least one coding/decoding generator and which produces on the output side signals containing the cryptodata or the clear data, respectively, comprising the steps of:

detecting, in a first part of the cryptographic system, the data transmission routines within the data entity or the coded text entity, respectively;

processing, in a second part of the cryptographic system, only the clear text or the cryptodata by at least one coding/decoding generator; and, combining the clear text present after processing as the cryptodata or the cryptodata present after processing as the clear text, with the detected data transmission routines such that the coded text entity is produced as the output signal of the cryptographic system during a coding operation and the data entity is produced as the output signal during a decoding operation.

2. Process according to claim 1, wherein detection of the data transmission routines is effected in a frame recognition circuit, whereby a control signal is produced to discontinue operation of at least one coding/decoding generator.

3. Process according to claim 2, wherein the first part of the cryptographic system is synchronized with an inlet cycle and a working cycle is produced for the second part of the cryptographic system by an "AND" logic combination of the inlet cycle with the control signal.

4. Process according to claim 3, wherein the inlet cycle is symmetrical.

5. Process according to claim 4, wherein an unchanged data entity or a coded text entity is passed on within the first part of the cryptographic system, and the clear text or the cryptodata are transmitted within the second part of the cryptographic system.

6. Process according to claim 5, wherein the clear text is filtered out from the data entity and the cryptodata is filtered out from the coded text entity by the operation of a first flip-flop element in the working cycle, said flip-flop element being located in the second part of the cryptographic system.

7. Process according to claim 6, wherein the data entity and the coded text entity, respectively, are conducted in synchronism with the inlet cycle through the first part of the cryptographic system.

8. Process according to claim 7, wherein the clear text or the cryptodata are conducted in synchronism with the working cycle through the second part of the cryptographic system.

9. Process according to claim 8, wherein at least one coding/decoding generator is operated in the working cycle.

10. Process according to claim 9, wherein said combining of the clear text present after processing as cryptodata, or the cryptodata present after processing as the clear text, with the data transmission routines is effected in a 2:1 multiplexer unit, located within the first part of the cryptographic system.

11. Process according to claim 10, wherein said combining takes place bit by bit and each bit of the clear text or the cryptodata of the unchanged data entity or the coded text entity are replaced by cryptodata or clear text.

12. Process according to claim 11, wherein combination of the cryptodata or the clear text with the data transmission routines is effected by operating a second flip-flop element in the inlet cycle, said second flip-flop element being located in the first part of the cryptographic system.

13. Process according to claim 12, wherein the clear text is replaced by routine data of a routine generator located within the second part of the cryptographic system, said generator being selectively activated as need in place of the at least one coding/decoding generator and operated in synchronism with the working cycle.

14. Process according to claim 13, wherein said routine data is key exchange information.

15. Process according to claim 13, wherein a self-synchronizing process is used for coding and decoding.

16. Cryptographic system for the coding of clear text and the decoding of cryptodata, with a clear text interface and at least one coding/decoding generator, said cryptographic system comprising:

a two stage construction, wherein a first part of the cryptographic system includes a frame recognition circuit and a 2:1 multiplexer unit and, a second part of the cryptographic system includes at least one coding/decoding generator, a routine generator and a routine receiver which transmit routine data.

17. Cryptographic system according to claim 15, wherein said routine data is transmitted for exchange of keys between communicating systems.

18. Cryptographic system according to claim 16, wherein an "AND" logic element is provided in the first part, which produces a working cycle for the second part of the cryptographic system from an inlet cycle controlling the first part and a control signal generated by the frame recognition circuit, said working cycle being different from the inlet cycle.

19. Cryptographic system according to claim 18, wherein a first flip-flop element is located in the second part of the cryptographic system, which may be operated in synchronism with the working cycle.

20. Cryptographic system according to claim 19, wherein a second flip-flop element is located in the first part of the cryptographic system for operation in synchronism with the inlet cycle.

21. Cryptographic system according to claim 20, wherein an alternating switch is provided in the second part of the cryptographic system, for selectively actuating either the coding/decoding generator or the routine generator.

22. Cryptographic system according to claim 21, further comprising a separate coding and decoding units, with a separate coding and decoding generator.

* * * * *